March 4, 1924.  
A. B. WELLS  
OPHTHALMIC LENS  
Filed Dec. 9, 1919  
1,485,655
FIG. I
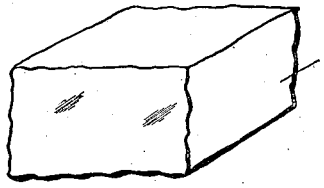
FIG. II
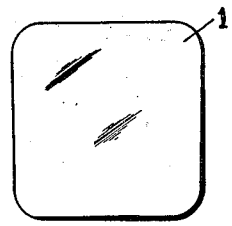
FIG. III
FIG. IV
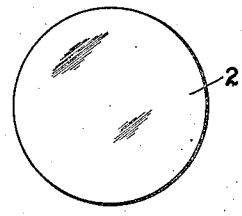
FIG. V
FIG. VI
INVENTOR  
ALBERT B. WELLS  
BY  
H. H. Styll & H. K. Parsons  
ATTORNEYS Patented Mar. 4, 1924.

1,485,655

UNITED STATES PATENT OFFICE.

ALBERT B. WELLS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed December 9, 1919. Serial No. 343,513.

*To all whom it may concern:*

Be it known that I, ALBERT B. WELLS, a citizen of the United States, residing at Southbridge, in the county of Worcester and State of Massachusetts, have invented certain new and useful Improvements in Ophthalmic Lenses, of which the following is a specification.

This invention relates to improvements in lenses, and has particular reference to ophthalmic lenses which will have the property of retarding certain selected rays of light without casting undesirable shadows on the face of the wearer.

One of the principal objects of this invention is the provision of an optical lens possessing the property of selective retardance of certain rays of light, which lens shall be of a color which will not be noticeable when in place on the face, and which will not throw undesirable shadows on the face.

Other objects and advantages of the invention should be readily apparent by reference to the following specification, and it will be understood that any modifications or departures may be made from the specific features disclosed within the scope of the claims without departing from the spirit of the invention. The preferred form being given only by way of example.

Figure I is a front view of a pair of spectacles showing the lenses of the invention in place on the face.

Figure II is a perspective view of a block of optical glass from which the lenses are made.

Figure III is a front view of a lens blank.

Figure IV is an edge view of Figure III.

Figure V is a front view of a completed lens, and

Figure VI is an edge view of Figure V.

The ordinary commercial optical lenses not only transmits the visible rays but also certain of the invisible rays, such as rays beyond the violet, and rays beyond the red ends of the spectrum. The rays beyond the violet have an irritating effect on the eye, while those beyond the red are heat producing rays.

It has long been known that the introduction of chemical elements into the ingredients forming commercial optical lenses would affect their transmission of light, so that it has been possible to produce optical lenses to transmit the desired rays and to retard the undesirable ones. Naturally the introduction of such elements has had its effect on other properties of the lenses, such as their color and their light transmission.

The important consideration for ophthalmic use has been to obtain a lens that would retard the undesirable rays and transmit the desirable ones without reducing materially the amount of desirable light transmitted and to eliminate the casting of undesirable shadows on the face. This has been a consideration long sought but never yet satisfactorily obtained. As for instance, the familiar amber lenses which have a high transmission of the visible rays, retards the ultra violet, but is objectionable on account of the yellow color and the yellowish tinge shadows it throws on the face. Smoke lenses are objectionable both as to color shadows and light transmission. Brown, green, orange and other colored lenses have also been used but are objectionable as to color, and the shadows they throw on the face. Natural objects when viewed through colored lenses have an artificial unnatural appearance.

The most satisfactory ophthalmic lens that has been obtained up to the present time is that known commercially as Crookes glass lenses. It has the desired properties of high transmission to the visible, retardance to the ultra violet, and is almost colorless when viewed from the front, but when viewed from the edge it has a dark or purplish color which casts a dark shadow immediately below and encircling the under eyelid, giving the wearer the appearance of illness; also when viewed from the front it gives a dark appearance under the eyes, being more pronounced on some complexions than on others. This has had the effect of materially reducing its adoption for general use, particularly by women.

Realizing the practical difficulties of color determination, I have in my invention proceeded on new lines. I have selected a color first that will be unnoticeable from the front when on the face, and whose edge shadows shall be such as to blend and harmonize with the tints of the face. Hence I have preferably selected a flesh tint and then proceeded to obtain the necessary ingredients and proportions to produce this tint and also give a high visible transmission and a retardance to undesirable rays.

Referring to the drawings, the glass for the lenses is prepared in the usual way, the ingredients being mixed in the molten mass and made into glass stock, after the usual treatment of fining, annealing, etc., and supplied in form required for lens manufacture, as diagrammatically illustrated by 3 in Figure II. This stock is fashioned into lens blanks by molding or pressing, or otherwise, into rough lens blanks, as illustrated by 1 in Figures III and IV, and these blanks are in turn ground, smoothed and polished by the usual lens producing means into semi-finished lenses, i. e., one side ground, or finished lenses; i. e., two sides ground as indicated by 2 in Figures V and VI. The lenses are then cut to shape and fitted to the eyeglass or spectacle mountings or frames as shown in Figure I; 5 being the bridge connecting the two lenses, and 6 the temples to hold them in place on the face. The dark objectionable shadows present in the prior art lenses are indicated by the lines 4, Figure I, lying on the face under the eyes. The drawings are purely diagrammatic and intended solely to illustrate the steps of the production of the lenses of the invention, their application in use, and to particularly illustrate the defects of the prior art lenses in casting undesirable shadows on the face.

I have found from experiment that I can produce an optical glass having the desired high transmission of the visible, retardance to the invisible, and a flesh tint that is not noticeable when in place on the face, and will not cast undesirable face shadows, by mixing a pure ultra violet absorbing glass such as described by Sir William Crookes in a paper called—"The preparation of eye preserving glass for spectacles," read before the Royal Society, November 13, 1913, with a coloring material such as used in the well known amethyst, aureolin and flesh tinted decorative glasses used in art work.

The flesh tints of the face referred to herein are the tints or color of the face of the Caucasian or so-called white race. It would perhaps be found of advantage also in the light shades of the Mongolian or yellow race. In the darker races, such as the black, or Ethiopian, the red, or Indian, the brown, or Malay, it might not possibly be required in the majority of cases, as the ordinary lenses possessing the property of selective retardance of invisible light and transmission of visible light could be used without change to prevent the edge shadows which are so apparent upon the white or light races.

Such lenses may be ground in any manner known to the art for visional correction, and suitably mounted. When looking at the lens from the front it will appear colorless; when looking at its edge it will appear to be substantially a light pink color. The shadow cast upon the face will be such as to blend with the color of the face and, therefore, be unnoticeable.

Thus it will be seen that I have produced an ophthalmic lens which will protect the eye from injury by undesirable light rays as well as correct visional defects, and I accomplish these results without detracting from the appearance of the wearer.

I claim:

1. A lens element having an ingredient possessing the property of selective retardance of invisible light and transmission of visible light, and an ingredient that changes the color of the retarding ingredient to a shade that blends with the natural flesh tints of the face and will not cast noticeable shadows on the face when the lens is in place thereon.

2. A lens element having an ingredient possessing the property of retarding ultra violet rays and transmitting the visible rays, and an ingredient that changes the color of the ultra violet ray retarding ingredient to a pink shade.

In testimony whereof I have affixed my signature, in presence of two witnesses.

ALBERT B. WELLS.

Witnesses:
HARRY H. STYLL,
H. K. PARSONS.